(12) United States Patent
Chun

(10) Patent No.: US 8,376,093 B2
(45) Date of Patent: Feb. 19, 2013

(54) DISC BRAKE

(75) Inventor: Jae Hyung Chun, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 141 days.

(21) Appl. No.: 12/957,722

(22) Filed: Dec. 1, 2010

(65) Prior Publication Data

US 2011/0127123 A1    Jun. 2, 2011

(30) Foreign Application Priority Data

Dec. 1, 2009   (KR) .......................... 10-2009-117832

(51) Int. Cl.
*F16D 55/08* (2006.01)
(52) U.S. Cl. .................................................... 188/72.7
(58) Field of Classification Search ................. 188/72.7, 188/72.8, 73.31, 73.41, 71.7, 71.8, 247, 134
See application file for complete search history.

(56) References Cited

U.S. PATENT DOCUMENTS

| | | | | |
|---|---|---|---|---|
| 4,375,250 A | * | 3/1983 | Burgdorf | 188/72.2 |
| 2002/0113352 A1 | * | 8/2002 | Edwards | 267/166 |
| 2005/0145449 A1 | * | 7/2005 | Jelley et al. | 188/72.7 |
| 2007/0068747 A1 | * | 3/2007 | Barbosa | 188/72.7 |
| 2009/0020377 A1 | * | 1/2009 | Kim | 188/18 A |

FOREIGN PATENT DOCUMENTS

DE     19850678 C1 * 3/2000
KR   10-2007-0062770 A    6/2007

* cited by examiner

*Primary Examiner* — Robert A Siconolfi
*Assistant Examiner* — Anna Momper
(74) *Attorney, Agent, or Firm* — McDermott Will & Emery LLP

(57) ABSTRACT

Disclosed is a disc brake capable of constantly maintaining the braking performance by preventing the eccentric abrasion of a pad upon the braking operation. The disc brake includes a disc rotating together with a wheel, inner and outer friction pads installed at both sides of the disc, respectively, a caliper housing supporting the outer friction pad, a wedge member installed at a rear side of the inner friction pad and formed at a rear surface thereof with an inclined surface, a support member fixed to the caliper housing and formed with an inclined surface corresponding to the inclined surface of the wedge member, a driving device operating the wedge member for a braking operation, and a hinge unit for coupling the wedge member to the friction pad. The disc brake further includes an elastic member coupled to the wedge member and the friction pad while interposing the hinge unit therebetween.

5 Claims, 4 Drawing Sheets

(a)

(b)

DISC BRAKE

This application claims the benefit of Korean Patent Application No. 10-2009-0117832 filed on Dec. 1, 2009, in the Korean Intellectual Property Office, the disclosure of which is incorporated herein by reference.

BACKGROUND

1. Field

The disclosure relates to a disc brake employing an electric wedge brake (EWB) system for performing a braking operation by using a wedge member and a pad.

2. Description of the Related Art

A disc brake generates braking force by pressing a friction pad against an outer surface of a disc rotating together with a wheel. The disc brake includes an electronic wedge brake (EWB) that presses a friction pad against a disc by using a sliding type wedge member. For instance, the wedge member presses the friction pad against the disc while moving along an oblique side by a driving device.

The EWB includes a driving motor for driving the wedge member, a screw shaft coupled with a rotating shaft of the driving motor, and a pressing member coupled to the screw shaft such that the pressing member can move back and forth according to the operation of the driving motor to press the wedge member against the disc.

In such a disc brake, as the driving motor operates, the pressing member presses the wedge member against the disc, so that the friction pad makes contact with the disc. At the same time, the wedge member further presses the friction pad against the disc while moving along an oblique side, so that the braking action is achieved.

However, in this case, the moment is generated due to the friction so that the friction pad may be urged to the disc, thereby causing the eccentric abrasion to the initial contact part of the friction pad. If the eccentric abrasion occurs continuously, the braking performance of the EWB system may be degraded.

SUMMARY

Accordingly, it is an aspect of the disclosure to provide a disc brake, which includes a hinge unit or an elastic member between a wedge member and a friction pad to prevent the eccentric abrasion of a pad, thereby constantly maintaining the braking performance.

Additional aspects and/or advantages of the disclosure will be set forth in part in the description which follows and, in part, will be apparent from the description, or may be learned by practice of the disclosure.

The foregoing and/or other aspects of the disclosure are achieved by providing a disc brake for a vehicle. The disc brake may include a disc rotating together with a wheel; inner and outer friction pads installed at both sides of the disc, respectively; a caliper housing supporting the outer friction pad; a wedge member installed at a rear side of the inner friction pad and formed at a rear surface thereof with an inclined surface; a support member fixed to the caliper housing and formed with an inclined surface corresponding to the inclined surface of the wedge member; a driving device operating the wedge member for a braking operation; and a hinge unit for coupling the wedge member to the friction pad.

According to the disclosure, the disc brake may further include an elastic member coupled to the wedge member and the friction pad while interposing the hinge unit therebetween.

According to the disclosure, the elastic member includes a spring.

According to the disclosure, the elastic member includes synthetic resin having elasticity.

BRIEF DESCRIPTION OF THE DRAWINGS

These and/or other aspects and advantages of the disclosure will become apparent and more readily appreciated from the following description of the embodiments, taken in conjunction with the accompanying drawings of which.

DETAILED DESCRIPTION OF THE EXEMPLARY EMBODIMENTS

Figure 1:
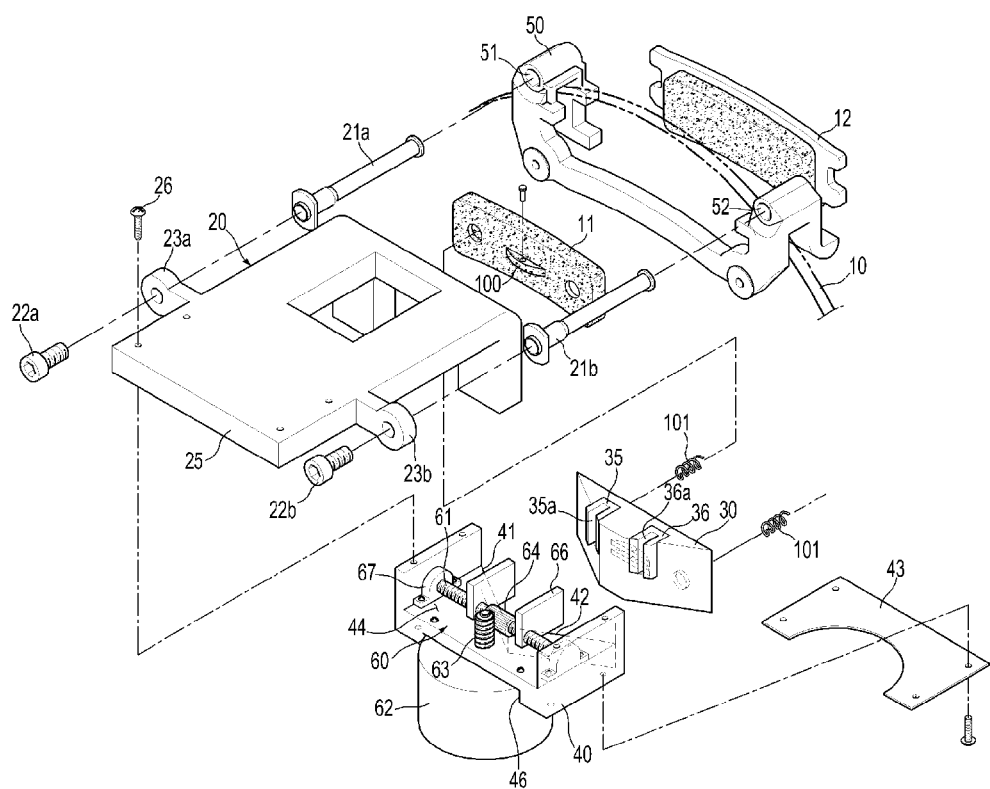
FIG. 1 is an exploded perspective view showing a disc brake for a vehicle according to the disclosure.

Reference will now be made in detail to the embodiments of the disclosure, examples of which are illustrated in the accompanying drawings, wherein like reference numerals refer to the like elements. The embodiments are described below to explain the disclosure by referring to the figures.

FIG. 1 is an exploded perspective view showing a disc brake for a vehicle according to the disclosure. As shown in FIG. 1, the disc brake includes a disc 10 rotating together with a vehicle wheel (not shown), and inner and outer friction pads 11 and 12 installed at both sides of the disc 10 for the purpose of friction braking of the disc 10. In addition, the disc brake further includes a caliper housing 20 and a wedge unit 30 for pressing the inner and outer friction pads 11 and 12 against the disc 10, a support member 40 for supporting the wedge member 30, and a driving device 60 that operates the wedge unit 30 to press the inner friction pad 11.

The inner and outer friction pads 11 and 12 are supported by a carrier 50 fixed to a knuckle part (not shown) of the vehicle in such a manner that the inner and outer friction pads 11 and 12 can move back and forth to press both sides of the disc 10. The caliper housing 20 is coupled to both sides of the carrier 50 through guide rods 21a and 21b coupled to both sides of the caliper housing 20 in such a manner that the caliper housing 20 can move back and forth. The guide rods 21a and 21b are coupled to rod coupling parts 23a and 23b provided at both sides of the caliper housing 20 by fixing screws 22a and 22b. The caliper housing 20 is provided at one end portion thereof with a bending extension part 24 and at an opposite end portion thereof with a support member coupling part 25 coupled with a support member 40 to press an outer surface of the outer friction pad 12 while moving back and forth. Both sides of an upper portion of the support member 40 are fixed to the caliper housing 20 by a fixing screw 26.

The wedge member 30 is provided at a rear side of the inner friction pad 11 and inclined surfaces 31 and 32 are symmetrically formed at a rear surface of the wedge member 30 in the form of a mountain. In addition, inclined surfaces 41 and 42, which are prepared in the form of a V groove, are formed in the support member 40 corresponding to the inclined surfaces 31 and 32 of the wedge member 30. Thus, when the wedge member 30 is pushed toward the disc 10, the inclined surfaces 31 and 32 of the wedge member 30 are pushed toward the disc 10 while making contact with the inclined surfaces 41 and 42 of the support member 40 so that the inner friction pad 11 is pressed against the disc 10. A support plate 43 is coupled to a lower portion of the support member 40 to support the wedge 30 such that the wedge member 30 can be prevented from moving downward.

As shown in FIG. 1, the driving device 60 that operates the wedge member 30 for the braking operation is installed on the support member 40. The driving device 60 includes a screw shaft 61 installed in a cavity 44 formed at an upper portion of the support member 40, a driving motor 62 installed at a lower portion of the support member 40 to drive the screw shaft 61 and having a shaft crossing the screw shaft 61 and the pressing direction of the inner friction pad 11, a worm gear assembly including a worm 63 provided at the shaft of the driving motor 62 and a worm wheel 64 installed at the center of the screw shaft 61 to engage with the worm 63, and first and second movable members 65 and 66 coupled with the screw shaft 61 to push the wedge member 30 toward the disc 10 according to the rotation of the screw shaft 61.

Both ends of the screw shaft 61 are rotatably supported by flanges 67 fixed to both sides of the cavity 44 formed at the upper portion of the support member 40. In addition, the first and second movable members 65 and 66 are extend toward the wedge member 30 by a predetermined distance in a state in which the first and second movable members 65 and 66 are coupled with the screw shaft 61 at both sides of the worm wheel 64. The wedge member 30 is formed with locking holes 35a and 35b for receiving the first and second movable members 65 and 66, and is provided with first and second guide members 35 and 36 for guiding the wedge member 30. Thus, when the first and second movable members 65 and 66 are moved due to the rotation of the screw shaft 61, the wedge member 30 is pushed toward the disc 10 while moving toward the inner friction pad 11, thereby pressing the inner friction pad 11.

The driving motor 62 is received in a motor receiving section 46 formed at the lower portion of the support member 40 in such a manner that the upper portion of the driving motor 62 can be partially accommodated in the motor receiving section 46. The shaft of the driving motor 62 vertically extends by passing through the support member 40 and the worm 63 of the worm gear assembly is engaged with the shaft of the driving motor 62.

A hinge unit 100 and elastic members 101 are connected to the wedge member 30 and the inner friction pad 11 of the disc brake, respectively.

Various methods can be used to fix the elastic members 101 to the wedge member 30. For instance, grooves can be formed in the wedge member 30 and the inner friction pad 11, an adhesive can be applied to the wedge member 30 and the inner friction pad 11, or a bolt and a bolt hole can be formed in the wedge member 30 and the inner friction pad 11, respectively.

Although springs are shown as the elastic members 101 in the drawings, various materials can be used as the elastic members 101 if they can horizontally maintain the friction pad 30.

Figure 2:
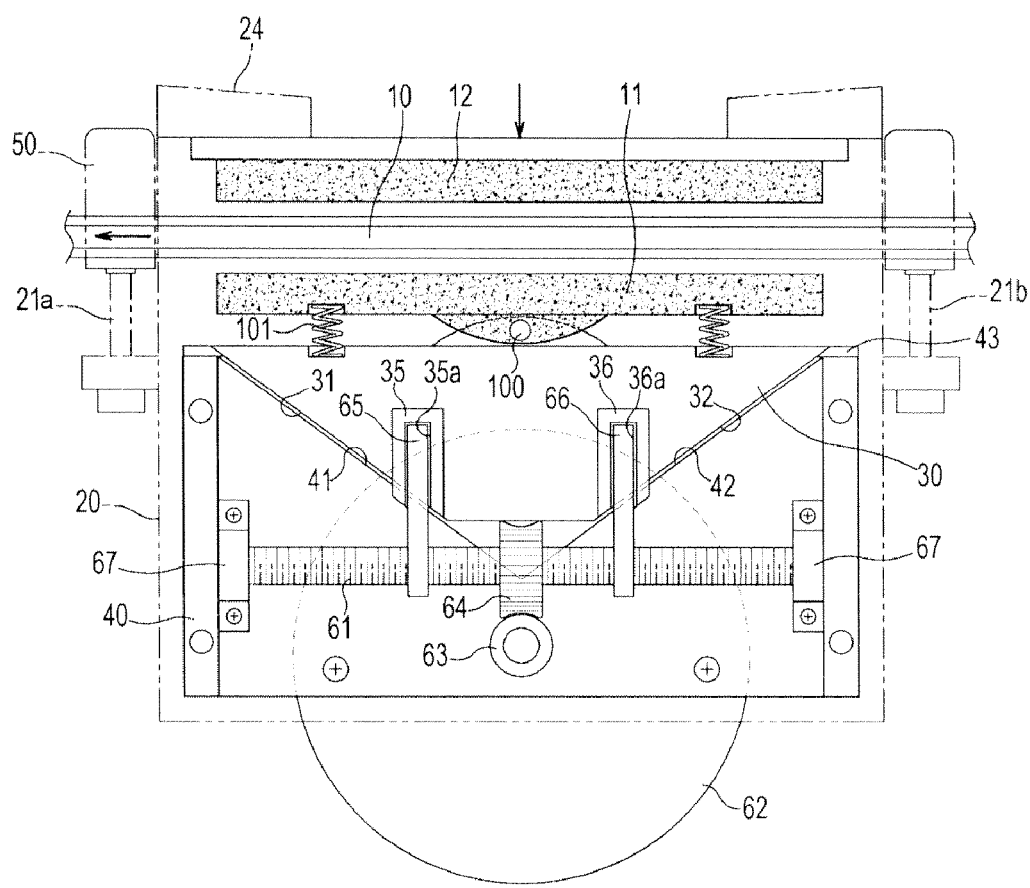
FIG. 2 is a view showing a release state of a disc brake for a vehicle according to the disclosure.
Figure 3:
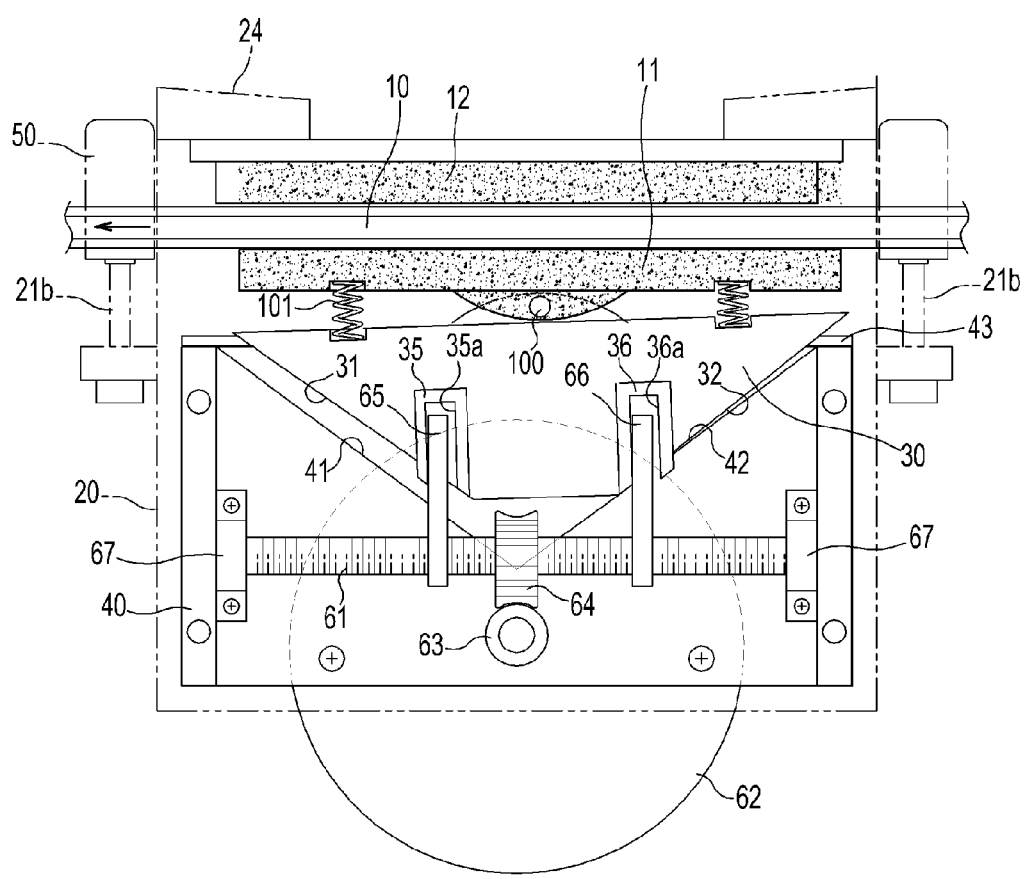
FIG. 3 is a view showing a braking state of a disc brake for a vehicle according to the disclosure.

FIG. 2 is a view showing a release state of the disc brake for the vehicle according to the disclosure, and FIG. 3 is a view showing the braking state of the disc brake for the vehicle according to the disclosure. Referring to FIGS. 2 and 3, as the driving motor 62 is driven, the worm 63 is rotated so that the worm wheel 64 is rotated at a low speed. Thus, the worm wheel 64 rotates the screw shaft 61 with a great rotational force. As the screw shaft 61 is rotated, the first and second movable members 65 and 66 move lengthwise along the screw shaft 61 while pushing the wedge member 30 toward the disc 10. At this time, the inclined surface 31 formed at the rear side of the wedge member 30 is pushed while making contact with the inclined surface 41 of the support member 40, so that the inner friction pad 11 is pressed against the disc 10, thereby braking the disc 10.

If the inner friction pad 11 makes contact with the disc 10, the inner friction pad 11 may tend to rotate in the rotational direction of the disc 10, so that the greater braking force may be generated.

In this manner, if the inner friction pad 11 presses the disc 10, a repulsive force is applied to the caliper housing 20, so that the caliper housing 20 is moved in the direction opposite to the pressing direction of the inner friction pad 11 while pressing the outer friction pad 12 against the disc 10. Thus, the same friction may be applied to both sides of the disc 10.

When the braking operation is released, the driving motor 62 is reversely driven, so that the screw shaft 61 is reversely rotated. Thus, the movable members 65 and 66 are moved in the reverse direction. Therefore, the pressing force of the wedge member 30 applied to the inner friction pad 11 is released.

Figure 4:
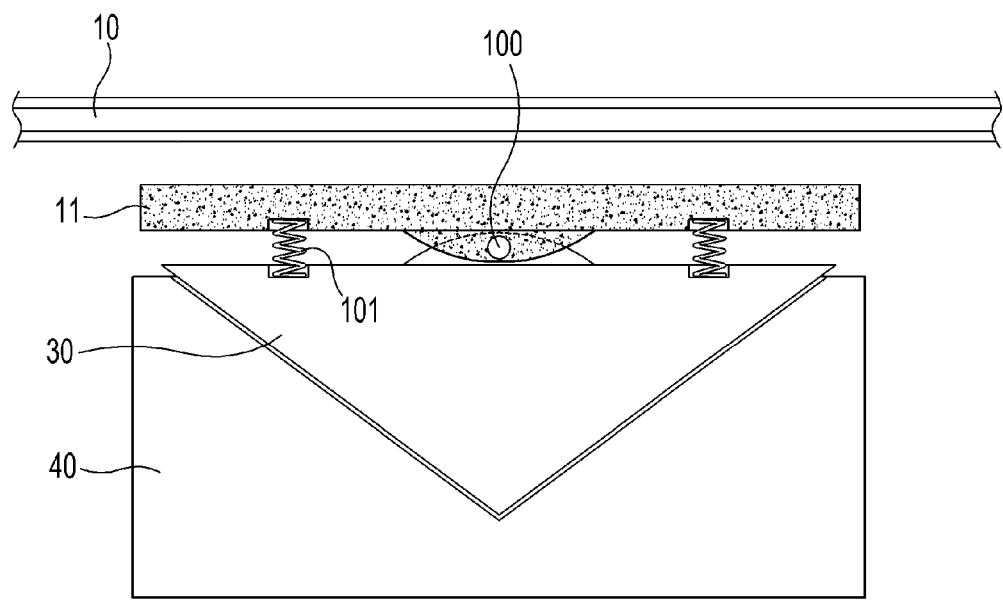
FIG. 4A is a schematic view showing a release state of a disc brake equipped with a hinge unit and an elastic member for a vehicle according to the disclosure.
FIG. 4B is a schematic view showing a braking state of a disc brake equipped with a hinge unit and an elastic member for a vehicle according to the disclosure.
Figure 4:
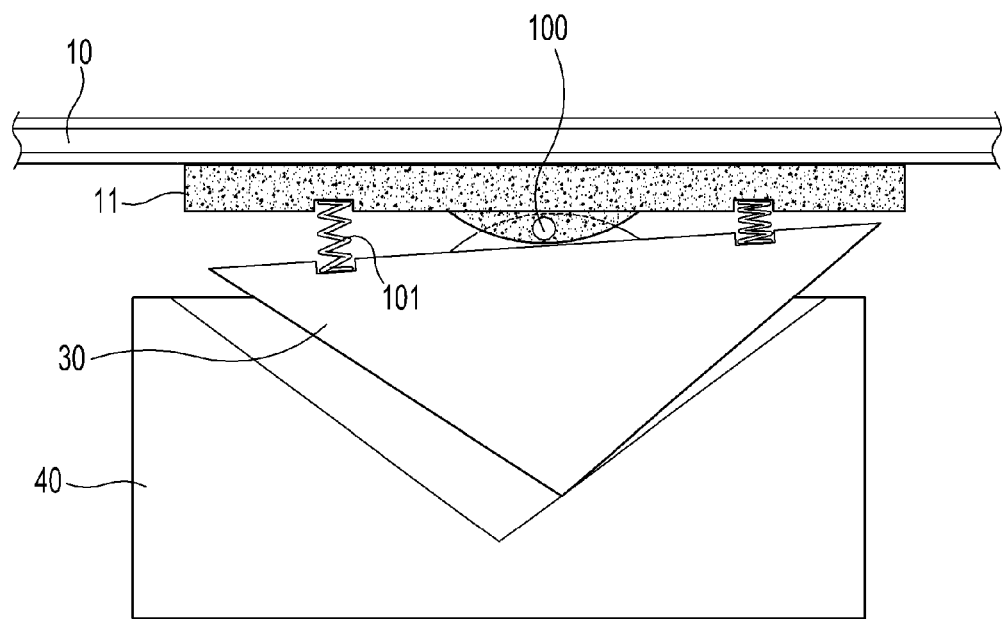

FIGS. 4A and 4B are schematic views showing a release state and a braking state of the disc brake equipped with the hinge unit and the elastic member for the vehicle according to the disclosure.

If the inner friction pad 11 makes contact with the disc 10, frictional force proportional to the pressing force of the inner friction pad 11 with respect to the disc 10 is applied in the direction opposite to the horizontal moving direction of the inner friction pad 11.

At this time, as shown in FIG. 4B, the wedge member 30 is inclined at a predetermined angle about the hinge unit 100 installed at the center between the wedge member 30 and the inner friction pad 11, so that the inner friction pad 11 can be horizontally maintained, thereby preventing the eccentric abrasion of the inner friction pad 11.

In addition, in the elastic members 101 that connect the wedge member 30 to the inner friction pad 11 about the hinge unit 100, the elastic member 101 located in the horizontal moving direction of the wedge member 30 and the inner friction pad 11 is compressed and the elastic member 101 located in the direction opposite to the horizontal moving direction of the wedge member 30 and the inner friction pad 11 is expanded upon the braking operation to absorb the friction applied between the inner friction pad 11 and the disc 10, thereby preventing the eccentric abrasion of the inner friction pad 11. Further, when the braking operation is released as shown in FIG. 4A, the wedge member 30 and the inner friction pad 11 can be horizontally maintained without being fluctuated.

The disclosure can be applied not only to the EWB system having the above structure, but also to the EWB system performing the braking operation by using a normal wedge member and a normal pad.

Although few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A disc brake for a vehicle, the disc brake comprising:
   a disc rotating together with a wheel;
   inner and outer friction pads installed at both sides of the disc, respectively;

a caliper housing supporting the outer friction pad;
a wedge member installed at a rear side of the inner friction pad and formed at a rear surface thereof with an inclined surface;
a support member fixed to the caliper housing and formed with an inclined surface corresponding to the inclined surface of the wedge member;
a driving device operating the wedge member for a braking operation; and
a hinge unit for coupling the wedge member to the inner friction pad, wherein the wedge member is arranged and configured to move so as to rotate about the hinge unit.

2. The disc brake of claim 1, further comprising an elastic member coupled to the wedge member and the friction pad while interposing the hinge unit therebetween.

3. The disc brake of claim 2, wherein the elastic member includes a spring.

4. The disc brake of claim 2, wherein the elastic member includes synthetic resin having elasticity.

5. The disc brake of claim 1, wherein the driving device includes a motor.

* * * * *